United States Patent

[11] 3,599,307

| [72] | Inventors | Gabe L. Campbell<br>Greenville;<br>Henry A. Johnson, Dayton, both of, Ohio |
|---|---|---|
| [21] | Appl. No. | 847,653 |
| [22] | Filed | Aug. 5, 1969 |
| [45] | Patented | Aug. 17, 1971 |
| [73] | Assignee | The United States of America as represented by the Secretary of the Air Force |

[54] PRODUCTION OF HOLLOW BALL OR ROLLER BEARING BY SWAGING OR OTHER COMPRESSIVE METHOD
6 Claims, 6 Drawing Figs.

[52] U.S. Cl. .................................................. 29/148.4 A, 29/148.4 B, 29/148.4 R, 308/188, 308/202
[51] Int. Cl. .................................................. B23p 11/00, B21h 1/14, F16c 33/32, F16c 33/34
[50] Field of Search ........................................... 29/148.4 A, 148.4 B, 148.4 R, 200, 200 B, 463; 308/188, 202

[56] References Cited
UNITED STATES PATENTS
| 1,039,674 | 9/1912 | Schatz | 29/148.4 |
| 2,963,772 | 12/1960 | Niles, Sr. | 29/148.4 |

Primary Examiner—Thomas H. Eager
Attorneys—Harry A. Herbert, Jr. and Arthur R. Parker ABSTRACT: A unique hollow type of ball or roller bearing, fabricated from a pair of half-shell members having a matching male and female type of mechanical joint-reinforcing means extending therebetween, is initially joined along a well-defined joint area, and is thereafter swaged or otherwise compressed into a smaller-and-smaller diameter until a substantial migration of metal is interchanged between, and thereby eliminates the previously well-defined joint area to thus provide a more stable and stronger union.

PATENTED AUG 17 1971 3,599,307

INVENTORS
GABE L. CAMPBELL
HENRY A. JOHNSON
BY Harry A. Herbert Jr
ATTORNEY
Arthur R. Parker
AGENT 3,599,307

1

PRODUCTION OF HOLLOW BALL OR ROLLER BEARING BY SWAGING OR OTHER COMPRESSIVE METHOD

BACKGROUND OF THE INVENTION

This invention relates generally to the field of bearing technology and, in particular, to the hollow type of ball or roller bearing having a pair of hollow hemispheric or half-cylindrical elements in which improved means are utilized for uniting the said pair of elements into a single, unitary bearing structure.

In previously developed hollow ball or roller bearing structures, a pair of half-shell elements in the form of hemispheres, or half cylinders have been joined together generally by means of a butt-joint arrangement which has been united either by means of welding, or by some diffusion-bonding method. With such welding or bonding methods, however, an excessive amount or "flash" of material has been upset both inside and outside of the joint area. While the excess or "flash" of material on the outside surface of the joint may be rather easily removed, that formed on the inside surface thereof, of course, remains. This upset of material remaining on the inside of the joint results in an undesirable creation of stress raisers, promotes a nonuniform stiffening, and creates unbalanced and therefore unstable conditions in the bearing during its operation. In addition, such welded, or diffusion-bonded joints have also proven to be relatively weak and, therefore, comparatively unreliable. The present invention solves or, at least, substantially alleviates the aforementioned problems in a new and improved manner, as will become evident from the following summary and detailed description thereof.

SUMMARY OF THE INVENTION

The present invention consists briefly in forming a rolling bearing member from two hollow half-shell elements which have been initially joined as by welding or bonding along a well-defined joint area. The already joined half-shell elements are thereafter uniquely further and more effectively united by the application of swaging or other compressive means being applied to, and thereby reducing the diameter and thus the size of the rolling bearing member.

This reduction in the diameter of the bearing member creates a migration of metal between the two half-shell elements and thereby eliminates the normally well-defined joint area occurring when the said two elements have been joined as by welding, or diffusion-bonding. This elimination of the well-defined joint area which is normally formed in other ball or roller bearing fabrication methods naturally reduces or entirely eliminates the excess or "flash" of material formed in the joint area when the said two half-shell elements are entirely united by welding or diffusion-bonding and, as such, a stronger, more effective, and stable bearing structure is created.

Other advantages, as well as objects, of the invention will become readily apparent from the following disclosure thereof, in which:

DESCRIPTION OF THE PREFERRED EMBODIMENT

Figure 1:
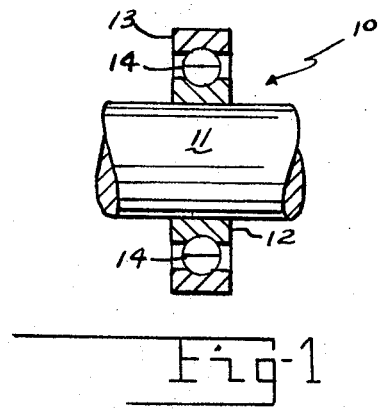
FIG. 1 is a cross-sectional view, partly broken-away, illustrating a type of bearing assembly shown mounted on a shaft member and in which the improved hollow ball or roller bearing element of the present invention may be incorporated.
Figure 2:
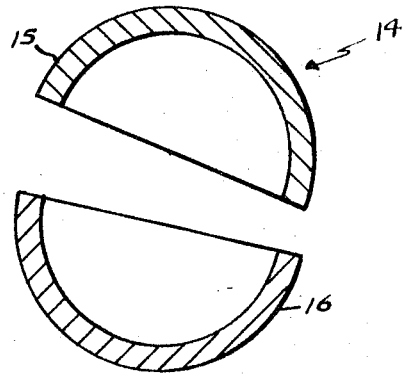
FIG. 2 is an enlarged view, in cross section, of one form of hollow ball or roller bearing, shown in disassembled condition, which may be applied to the bearing assembly of FIG. 1, and to which the improved uniting means of the present invention is readily adaptable.

Referring generally to the drawing and, in particular, to FIG. 1 thereof, one type of bearing assembly in which the improvement of the present invention may be incorporated is indicated generally at 10 as being mounted on a shaft member 11. Bearing assembly 10 partially includes an inner race, indicated at 12, an outer race at 13, and a plurality of hollow rolling bearing elements, two of which are indicated at the reference numerals 14, and to which the improved bearing fabrication means of the present invention may be applied. Said rolling bearing elements 14, which are naturally disposed in bearing contact between said inner and outer races 12, 13, may be formed into either a hollow hemispherical or half-cylindrical configuration by any suitable means depending on whether the ball or roller bearing application is to be utilized. In this connection, FIG. 2, which depicts a relatively enlarged view of one of said plurality of hollow rolling bearing elements 14, clearly illustrates that each of the latter may consist of an identical pair of hollow half-shell elements, indicated at 15 and 16, which may represent either hemispheres of half-cylinders, as noted hereinbefore.

Figure 3:
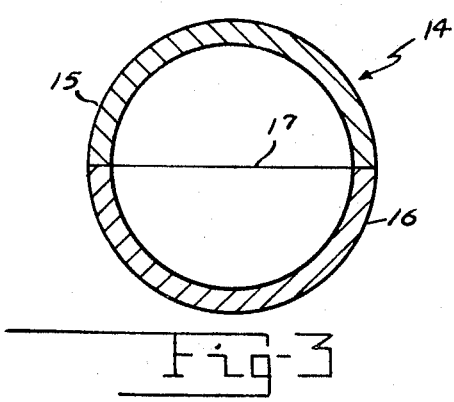
FIG. 3 illustrates the hollow ball or roller bearing of FIG. 2 in its assembled condition with the two half-shell elements thereof shown joined along a well-defined, common welding or bonding area.
Figure 4:
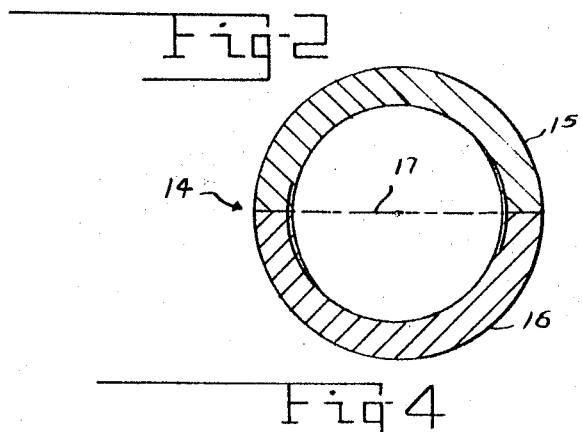
FIG. 4 schematically depicts the hollow half-shell elements of FIG. 3 further joined together in the improved manner of the present invention with the former well-defined joint area therebetween having been eliminated.

As seen in FIG. 3, the open end portions of the aforementioned hemispheres, or half-cylinders 15, 16 have been joined together into the previously noted composite ball or roller bearing element 14 along a common joint area, indicated at the reference numeral 17. This common joint area 17 may be joined by welding or diffusion-bonding as in the case of other types of hollow rolling bearing configurations. Such welding or diffusion-bonding methods form the previously described upset or "flash" of material at the said joint area 17 on both inside and outside surfaces thereof. However, in accordance with the teaching of the present invention and as schematically depicted in FIG. 4, the aforesaid hollow ball or roller bearing hemispheres or half-cylinders 15 and 16 are brought into a more effective union with respect to each other by the unique and novel application thereto of the process of swaging or other compressive means. Thus, after being initially joined along the well-defined joint area 17 by the usual welding or bonding methods, half-shell elements 15, 16 are further compressed together by swaging or other means. This latter operation of the present invention, of course, forces elements 15, 16 together into a much tighter or closer fitting configuration thereby reducing the overall diameter and size of the ball or roller bearing element 14 formed thereby to that required for the particular bearing application. More importantly, this swaging down of the said ball or roller bearing element 14 to its proper size causes a migration of metal to occur between the joined hemispheres or half-cylinders 15, 16. This metal migration has the twofold effect of both eliminating the previously formed, well-defined joint area 17 and the creation of a near uniform metallic structure between the said half-shell elements 14. In this novel manner, a much more effective and more stable union of the elements of the ball or roller bearing is the result. The former position of the said joint area 17 is shown in phantom in FIG. 4 for the sake of clarity only.

Figure 5:
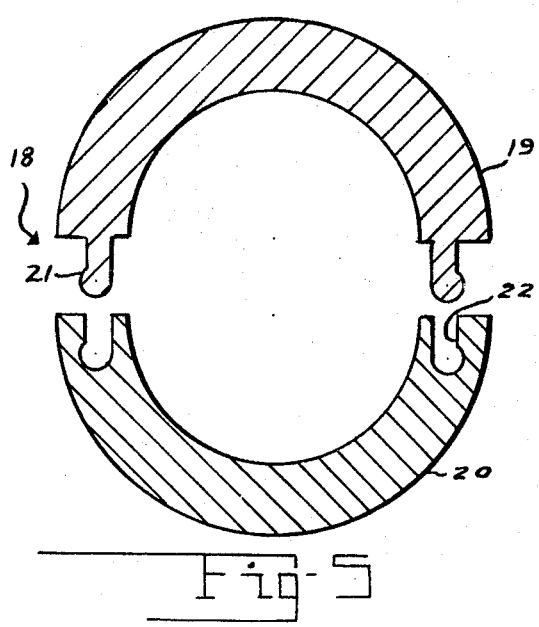
FIGS. 5 and 6 respectively illustrate disassembled and assembled views of a modified form of ball or roller bearing member to which the present invention is also readily applicable.
Figure 6:
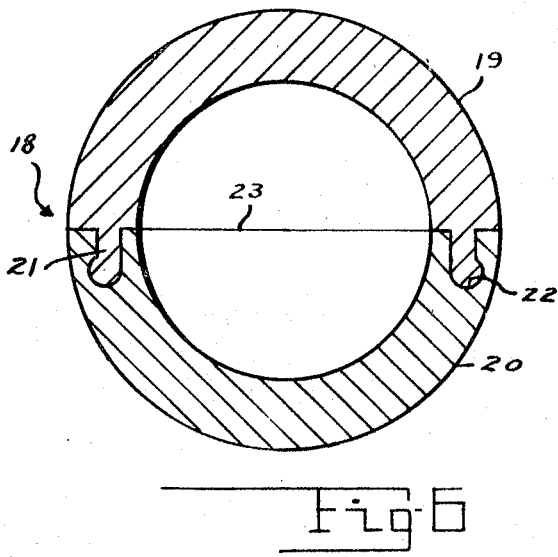

In FIGS. 5 and 6, a modified ball or roller bearing member is indicated generally at 18, respectively in disassembled and assembled conditions, as including a pair of half-shells at 19 and 20, which again, may represent either a ball or roller bearing configuration. Each of said half-shells 19, 20 have been further modified over their counterparts of FIG. 2 through 4 to provide for a specific mechanical joint therebetween. For example, on the one hand, half-shell 19 is shown formed with a protruding, hook-shaped flange or male joint portion extending outwardly of the open end thereof, as is indicated at 21, whereas, on the other hand half-shell 20 is specifically adapted to be mechanically interconnected or joined therewith by its being formed with a recessed, or cutout female joint portion at 22 in the outer open end thereof. This recessed portion 22 is made of identical shape to, and exactly complements or matches with the said male joint portion 21, when interconnected therewith. The said male joint portion 21 may be initially forced into said female joint portion 22 to thereby effect the aforementioned mechanical joint therebetween. Again, this mechanical joint is along a well-defined joining area. However, after having been mechanically joined in the manner indicated hereinbefore, the two hemispheres or half-cylinders forming the half-shells 19 and 20 may then be thereafter swagged down, or otherwise compressed to a reduced diameter or size appropriate to the desired bearing application and, in this manner, an improved and novel union of the metal in both of said half-shells 19 and 20 is the result. Thus, as in the case of the inventive form of FIG. 4, this migration of metal in the joining area both eliminates the previous, well-defined joint area, indicated at the reference numeral 23 in FIG. 6, and thereby results in an improved union between shells 19 and 20 which exhibits a nearly uniform structure.

The above-described mechanical joint, initially formed and indicated by the common and well-defined joint area 23 may be further improved by the subsequent heat treatment thereof, after the aforementioned swagging operation has occurred, to thereby allow or effect diffusion between the parent metallic material interfaces of the aforesaid half-shells 19, 20. The latter operation to effect a more efficient union between said elements may be even further enhanced by the application of brazing material to the mechanical joint area 23 prior to the subsequent heat treatment thereof.

We claim:

1. In a method of fabricating a roller bearing member from a pair of half-shell elements, the steps comprising; initially forming each of the pair of half-shell elements into a hemispherical or half-cylindrical configuration representing respectively a ball or roller bearing member; subsequently initially joining said half-shell elements along a common and well-defined joint area to thereby define a ball or roller bearing structure of predetermined size; and thereafter applying means adapted to force said half-shell elements of said ball or roller bearing into a closer-and-closer fitting relation relative to each other and resulting in a smaller-and-smaller diameter until the metal in each half-shell element has sufficiently migrated to the other half-shell element to thereby eliminate the initially formed, well-defined joint area therebetween and thus provide a more effectively united ball or roller bearing structure; the initial step of forming said pair of half-shell elements into a hemispherical or half-cylindrical configuration further comprising the additional step of further forming each of said pair of half-shell elements each with complementarily disposed means relative to one another for ensuring an initially actuated mechanical joint adapted to be interconnected therebetween.

2. In a method of fabricating a rolling bearing member as in claim 1, wherein the complementarily disposed means included in the step of further forming each of said half-shell elements with a mechanical joint may further comprise forming one of said half-shell elements with an open end having a protruding, outer interconnecting portion, and the other of said elements with an open end having a recessed portion adapted to engage and precisely interfit with said protruding interconnecting portion to thereby effect the mechanical joint disposed therebetween.

3. In a method of fabricating a rolling bearing member as in claim 2, wherein the step of further forming said half-shell elements with a mechanical joint disposed therebetween may include the additional step of heat-treating the mechanical joint to effect diffusion of, and between the parent metal initially formed in the respective interfaces the half shell elements comprising said joint to thereby further enhance the union of metal formed during the forcing of said elements into a closer-and-closer relation.

4. In a method of fabricating a rolling bearing member as in claim 2, wherein the step of further forming said half-shell elements with a mechanical joint may include the additional steps of initially applying brazing material to the mechanical joint so formed, and thereafter heat-treating the brazed mechanical joint to ensure an even more effective union therewithin.

5. In a rolling bearing assembly having an inner race member; an outer race member; and a plurality of rolling bearing members disposed in bearing relation between said inner and outer race members; each of said rolling bearing members comprising a pair of half-shell elements each adapted to be formed into a hemispherical or half-cylindrical configuration respectively representing a ball or roller bearing, said pair of half-shell elements each incorporating open end portions interconnected with, and forced into each other during the final fabrication of said half-shell elements to thereby form a stronger and more stable union of the metal in both elements; the open end portion of one of said pair of half-shell elements incorporating a hook-shaped, protruding male joint portion, and the open end portion of the other half-shell element of said pair incorporating a recessed, female joint portion exactly matching and therefore precisely interfitting with said protruding hook-shaped, male portion to thereby provide a mechanical joint between said half-shell elements; said hook-shaped, protruding male joint portion being initially forced into precise engagement within said recessed, female joint portion and thereafter further compressed thereinto to provide for a migration of metal between the mechanical joint and thus ensure a more effective and stable union between each of said half-shell elements.

6. In a roller bearing assembly as in claim 5, wherein the mechanical joint formed between said pair of half-shell elements may further include brazing material adapted to be heated to thereby further ensure a more efficient union between said elements.